US009586797B2

(12) United States Patent
McVicar et al.

(10) Patent No.: US 9,586,797 B2
(45) Date of Patent: Mar. 7, 2017

(54) MOTORISED TRUCK WITH TILLER

(76) Inventors: Martin McVicar, County Monaghan (IE); Robert Moffett, County Monaghan (IE); Mark Whyte, County Monaghan (IE)

( * ) Notice: Subject to any disclaimer, the term of this patent is extended or adjusted under 35 U.S.C. 154(b) by 41 days.

(21) Appl. No.: 14/425,498

(22) PCT Filed: Sep. 4, 2012

(86) PCT No.: PCT/EP2012/067238
§ 371 (c)(1),
(2), (4) Date: Jul. 1, 2015

(87) PCT Pub. No.: WO2014/037033
PCT Pub. Date: Mar. 13, 2014

(65) Prior Publication Data
US 2015/0307336 A1 Oct. 29, 2015

(51) Int. Cl.
*B62D 1/14* (2006.01)
*B66F 9/075* (2006.01)
(Continued)

(52) U.S. Cl.
CPC ............ *B66F 9/07568* (2013.01); *B62D 1/14* (2013.01); *B62D 5/0418* (2013.01); *B62D 6/002* (2013.01); *B66F 9/065* (2013.01)

(58) Field of Classification Search
CPC ........ B66F 9/07568; B66F 9/065; B62D 1/14; B62D 5/0418; B62D 6/002
See application file for complete search history.

(56) References Cited

U.S. PATENT DOCUMENTS 5,265,021 A 11/1993 Avitan
7,017,689 B2 * 3/2006 Gilliland .................. B62B 5/06
180/19.1
(Continued)

FOREIGN PATENT DOCUMENTS

JP 03235762 10/1991
WO 99/43534 9/1999
WO 2004/007266 1/2004

OTHER PUBLICATIONS

International Search Report issued in corresponding International Application No. PCT/EP2012/067238 on May 28, 2013.

*Primary Examiner* — Kevin Hurley
*Assistant Examiner* — Marlon A Arce
(74) *Attorney, Agent, or Firm* — Whiteford, Taylor & Preston, LLP; Gregory M. Stone

(57) ABSTRACT

A motorized truck with tiller such as a pallet carrier or forklift truck has a tiller-controlled steerable wheel 14 which is steered by a motor having an associated steering motor controller. The steering motor controller in a normal mode of operation detects movement of the tiller as it is rotated relative to the chassis to steer the truck, and outputs control signals to cause the steering motor to steer the wheel such that it follows the tiller angle with a fixed, predetermined offset (which may be zero or non-zero). In a realignment mode of operation, the controller can change the predetermined angular offset, and the controller can preferably align the wheel with the tiller or with an axis of the chassis. The truck can be maneuvred more easily into and out of tight spaces with the operator and tiller offset to the side of the truck. The tiller can also be offset manually from the wheel by decoupling the tiller and wheel, and thereby changing the predetermined offset for subsequent operation.

20 Claims, 9 Drawing Sheets

(51) Int. Cl.
  *B62D 5/04* (2006.01)
  *B62D 6/00* (2006.01)
  *B66F 9/065* (2006.01)

(56) References Cited

U.S. PATENT DOCUMENTS

| | | | |
|---|---|---|---|
| 8,930,082 B2* | 1/2015 | Keller | B62D 7/026 |
| | | | 180/402 |
| 9,352,773 B2* | 5/2016 | Keller | B62D 5/092 |
| 2009/0200097 A1 | 8/2009 | Farber et al. | |
| 2011/0231059 A1 | 9/2011 | Hanna et al. | |
| 2014/0209406 A1* | 7/2014 | Wetterer | B66F 9/07509 |
| | | | 180/400 |

* cited by examiner

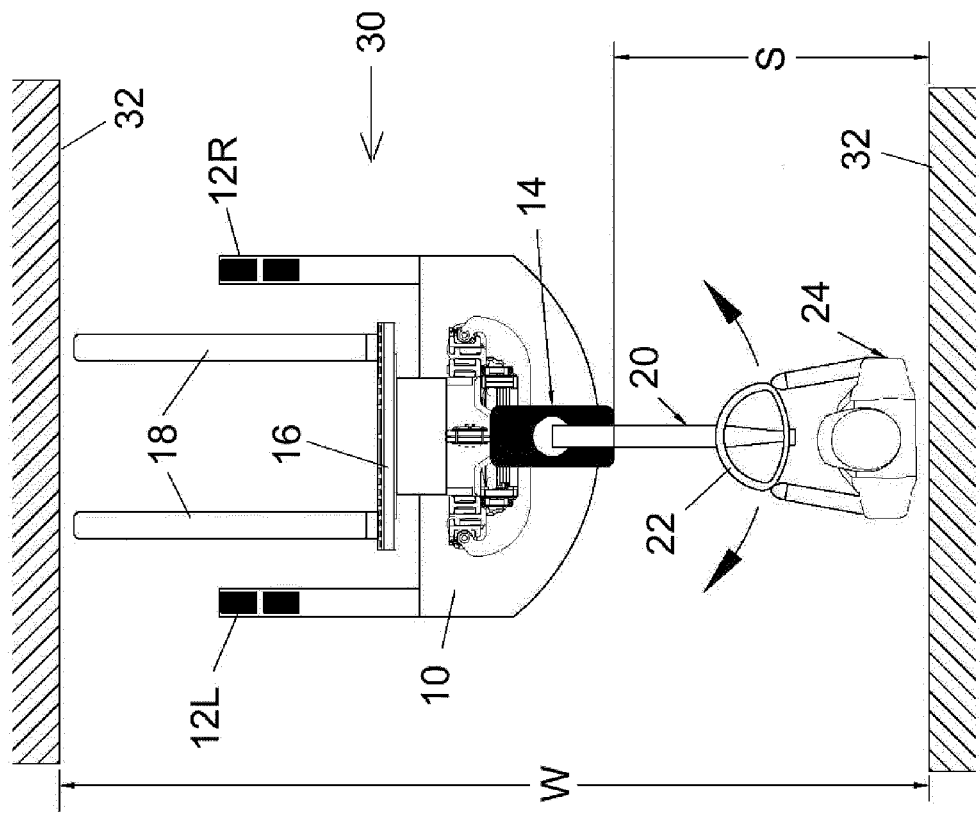
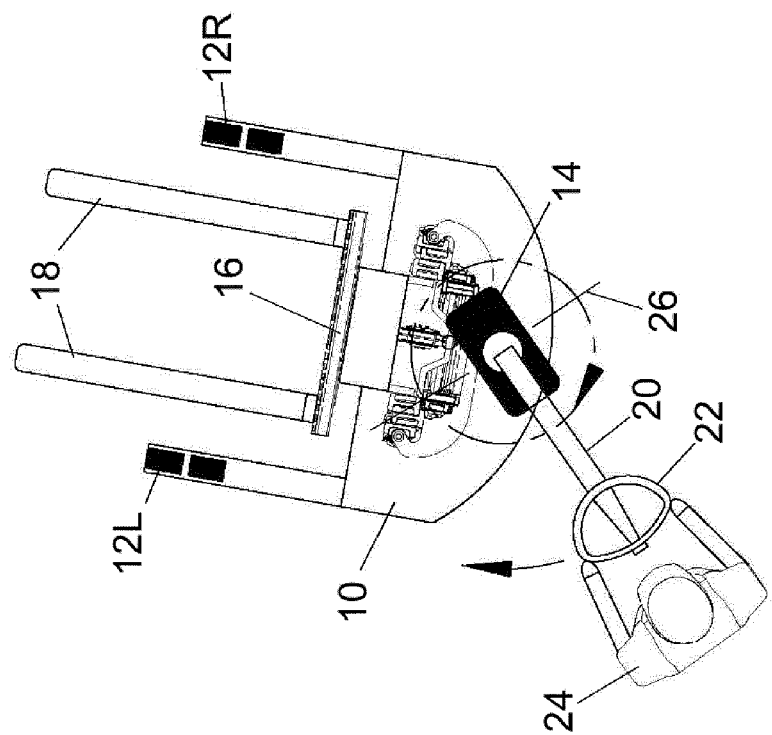

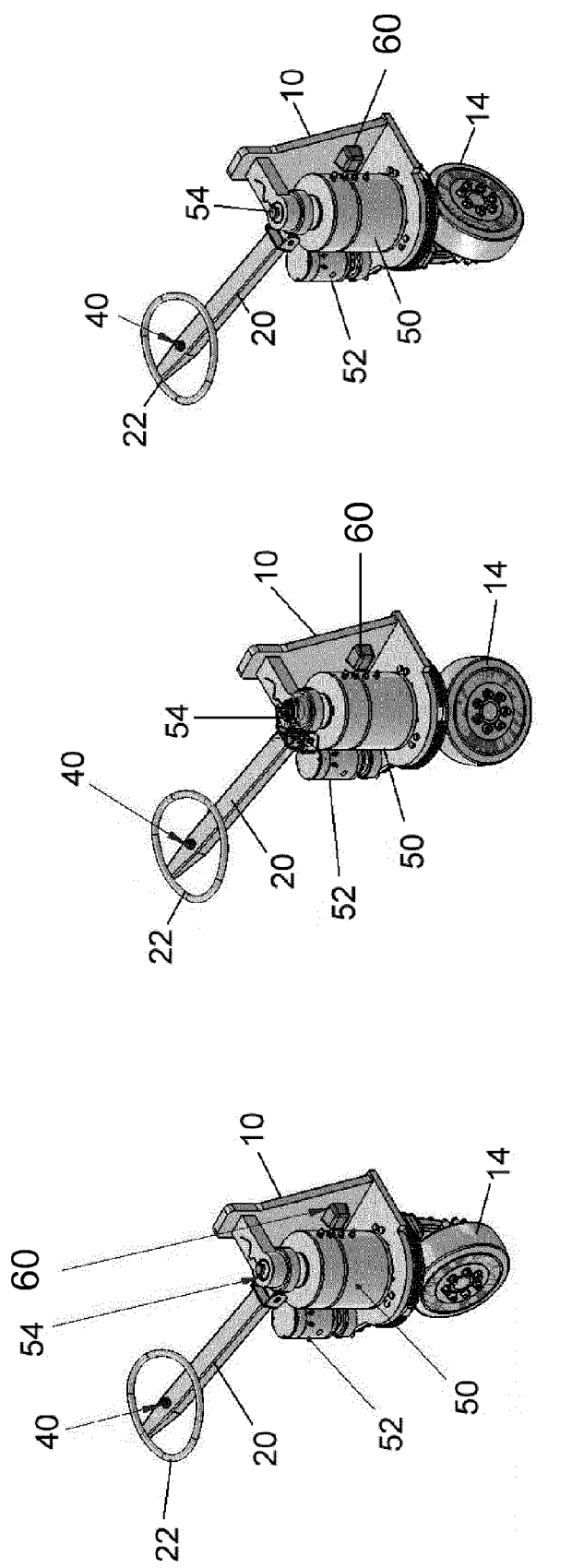

MOTORISED TRUCK WITH TILLER

TECHNICAL FIELD

This invention relates to a motorised truck having a tiller-controlled steerable wheel. The invention is especially, but not exclusively, applicable to pedestrian-operated pallet carriers, forklift trucks and order pickers.

BACKGROUND ART

Many materials are stored in warehouses on pallets, either on the ground or above ground on racking. Aisles between the palletised materials allow the operator of pedestrian-operated forklift trucks to select whatever pallet they require. However, the aisles need to have a certain minimum width to allow unrestricted operation of the trucks. This will now be described with reference to FIGS. 1a and 1b.

FIG. 1a is a schematic top plan view of a conventional pedestrian-operated forklift truck. The truck comprises a chassis 10 having left and right non-steerable, non-driven front wheels 12L, 12R respectively and a steerable rear drive wheel 14 disposed centrally between, but rearwardly displaced, relative to the front wheels. The chassis 10 carries a conventional lifting mechanism such as a mast 16 and lift forks 18. In some trucks with tillers the lift forks are replaced by lift platforms. The rear wheel 14 is directly or indirectly connected to a steering tiller 20 by a mechanical, hydraulic, electrical or other coupling. The truck is controlled from a tiller head 22, mounted at the free rear end of the tiller 20, by a pedestrian operator 24. A traction motor (not shown in FIGS. 1a and 1b) drives the steerable rear wheel 14 in forward or reverse directions about a horizontal rotation axis 26 under the control of manually operable control members (also not shown) on the tiller head 22.

The rear wheel 14 is steerable by rotation about a substantially vertical axis by rotation of the tiller 20. The connection between the tiller 20 and the rear wheel 14 is such that when the tiller 20 is rotated through a certain angle the rear wheel 14 follows suit so that the rear wheel 14 is always in line with the tiller 20; i.e. the horizontal rotational axis 26 of the rear wheel 14 is always normal to a vertical plane containing the tiller 20.

Conventional pedestrian-operated forklift trucks as described above normally operate in an aisle 30 (FIG. 1b) between two parallel rows 32 of palletised product. In order to pick up any particular pallet the truck needs to be initially positioned at right angles to the row 32 with the tiller 20 extending directly to the rear, as shown in FIG. 1b. This means that the aisle 30 must have a minimum width W equal to the total length of the truck. The required steering space S is necessary but effectively wasted storage space.

DISCLOSURE OF THE INVENTION

According to the present invention there is provided a motorised truck with tiller comprising:
 (a) a chassis having a plurality of ground-engaging wheels, at least one of which is steerable to steer the truck;
 (b) a drive motor for driving at least one of the wheels to move the truck across the ground;
 (c) a tiller rotatably connected to the chassis which may be swung from side to side to steer the truck;
 (d) a steering motor for varying the angle of the steerable wheel;
 (e) a steering motor controller which, in a normal mode of operation, receives as an input an indication of the tiller angle and which outputs in response thereto a control signal to the steering motor to vary the angle of the steerable wheel such that the angle between the tiller and steerable wheel maintains a predetermined angular offset;
 wherein the angular offset between the tiller and steerable wheel may be adjusted and the adjusted angular offset subsequently used as the predetermined angular offset.

This allows greater manoeuvrability compared to conventional trucks where the tiller is in fixed alignment with the drive wheel. It further allows the truck to be driven straight ahead forward or backwards with the tiller offset by a considerable amount, such as with the operator and tiller offset to the side of the truck.

The steering motor controller may be integral with the steering motor or separate therefrom. It may be implemented in hardware, firmware, or in software running on a suitable processing apparatus. It can be implemented as logic circuitry which may be programmable or dedicated to the task. Where the steering motor controller is implemented using programming, the apparatus on which it runs or into which it is programmed may perform additional functions related or unrelated to steering.

Preferably, the steering motor controller is further operable, in a realignment mode of operation, to steer the wheel so as to change said predetermined angular offset.

In particular, by allowing for a realignment mode of operation the tiller can be offset from the steering direction, or viewed another way, the steered wheel can be realigned along a different axis when the tiller is positioned off to one side.

A particularly preferred embodiment permits automatic alignment of the steered wheel with either of two major axes of interest, namely the tiller axis and a major axis of the truck chassis, i.e. the normal front-rear axis or the axis along which the tiller is aligned when in a neutral steering position.

Preferably, therefore, in said realignment mode of operation the steering motor controller is operable to change said predetermined angle between (i) a zero tiller angle wherein the wheel is aligned parallel to the tiller and (ii) a zero chassis angle wherein the wheel is aligned parallel to an axis of the chassis and offset from the tiller by the same angle as the tiller is offset from the chassis during the realignment mode of operation.

The axis of the chassis is, as mentioned above, preferably an axis defined by the axis of the tiller when the tiller is in a neutral steering position. It may be the front-rear axis, the left-right axis, an axis defined by forks provided on the truck (e.g. on a pallet carrier or forklift truck, etc.

Preferably, the steering motor controller receives as an input an indication of the tiller angle relative to one or more of the chassis, the steerable wheel, or the steering motor.

Further, preferably, the steering motor controller receives as an input an indication of the steerable wheel's steering angle relative to one or more of the chassis, the tiller, or the steering motor.

The received indication of tiller angle may be an absolute measurement or may be an indication that the angle has changed by a detected amount.

Preferably, the truck further includes an angular sensor system of one or more sensors which detect and output an indication or indications of the relative angle between two or more of the tiller, the steerable wheel, the steering motor, and the chassis.

Any suitable sensor system may be used to provide the required output. Preferably the sensor system comprises one or more rotary encoders which sense the relative angle between two or more components. The skilled person will appreciate that if, for example, the steering motor is fixed to the chassis and two angular sensors are provided, with one sensor providing the angle of the steered wheel relative to the motor housing, and the other providing the angle between the tiller and the motor housing (or chassis), then it is trivial to calculate the relative angle between the tiller and steered wheel as a sum or difference of the angles adjusted by an offset.

Further, preferably, the indication or indications output by said angular sensor system provide the steering motor controller with information to determine, during said realignment mode of operation, the angle between the tiller and the steerable wheel and/or the angle between the steerable wheel and the chassis.

More preferably, when said steering motor controller is operating to change said predetermined angle to a zero tiller angle it receives as an input from the angular sensor system information sufficient to determine the angle between the tiller and the steerable wheel, and when said steering motor controller is operating to change said predetermined angle to a zero chassis angle it receives as an input from the angular sensor system information sufficient to determine the angle between the steerable wheel and the chassis.

The drive motor is preferably operable to drive the steered wheel. It is operable regardless of whether the wheel is aligned with the tiller or the chassis or some other alignment. It may optionally be disabled during the realignment mode of operation but this is not critical.

In a preferred configuration the chassis supports the tiller at a rear end and forks at a front end, and the steered wheel is at the rear end, with one or more unsteered wheels (which may be driven or not) at the front end.

A particularly preferred configuration is a three-wheeled truck with two front wheels which are undriven and not steered, and a single driven, steered, rear wheel which is positioned generally beneath the rotation axis of the tiller.

The axis of rotation of the tiller is preferably vertical or includes a substantial vertical component (>45 degrees from horizontal, more preferably >60 degrees, even more preferably >75 degrees and most preferably 85 to 90 degrees from horizontal) such that when the tiller is rotated about the axis it swings sideways and not simply vertically (as it would about a horizontal axis).

In a preferred embodiment the tiller has a tiller head at its free end, the tiller head having one or more manual controls which when actuated engage the realignment mode of operation.

In a particularly preferred embodiment, the manual controls can select between at least two states, namely a zero tiller angle and a zero chassis angle as described above.

Preferably, when the steering motor controller is in said realignment mode of operation the tiller is decoupled from the steerable wheel.

Preferably, when the steering motor controller in said realignment mode of operation has completed steering the wheel so as to change said predetermined angular offset, the steering motor controller reverts to said normal mode of operation to steer said wheel to follow the tiller based on the new predetermined angular offset achieved in the realignment mode.

The realignment mode of operation may be implemented by storing a new predetermined angular offset which the steering motor then implements in a normal steering operation by matching the actual offset to the new stored offset.

In a further independent aspect of invention, there is provided a pedestrian-operated motorised truck with tiller, having a tiller-controlled steerable drive wheel, wherein the tiller can be selectively de-coupled from and re-coupled to the drive wheel to allow rotation of the tiller independently of the steering angle of the drive wheel, whereby the tiller can be fixed at different angular positions relative to the drive wheel.

This allows greater manoeuvrability compared to conventional trucks where the tiller is in fixed alignment with the drive wheel.

Preferably, the drive wheel is motorised and can be driven both with the tiller aligned with the wheel and with the tiller offset from the driving direction of the drive wheel.

This allows the truck to be manoeuvred in tight spaces, such as in warehouse aisles, with the operator and the tiller at an offset angle. In particular the truck can be driven forwards or backwards into or out of a loading space with the tiller offset and the operator standing to the side rather than in line with the driving direction.

In a preferred embodiment the tiller has a tiller head at its free end, the tiller head having a manually operable control member which when placed in one state de-couples the tiller from the drive wheel and when placed in a second state re-couples the tiller to the drive wheel.

The truck preferably has a steering motor for varying the steering angle of the drive wheel.

Further, preferably, the truck has a steering motor controller which receives as an input an indication of tiller angle and which outputs a control signal to the steering motor to change the steering angle in accordance with detected changes in the tiller angle.

Preferably, while the tiller is selectively decoupled from the drive wheel, changes in the tiller angle are either not received as an input or are not converted to output control signals to the steering motor.

The truck preferably further comprises a tiller angle sensor which senses the angle of the tiller relative to one of the drive wheel and a chassis of the truck with tiller and which provides an indication of said angle as an input to the steering motor controller.

The truck preferably further comprises an operator steering control to selectively engage the steering motor and vary the steering angle relative to the tiller.

In a preferred embodiment the steering motor controller is operable to receive as an input a selection of a specific angular relationship between the tiller and the drive wheel and to output a control signal to the steering motor to change the steering angle to said selection.

Preferably the truck is provided with a specific control input to enable selection of a particular angular relationship between the tiller and truck.

Preferably, the steering motor controller is operable to receive as an input an indication of the current steering angle and to compare the current steering angle with a desired angle stored in a memory or register accessible to the steering motor controller, and to output to the steering motor a control signal to change the steering angle to match said desired angle.

Preferably, the truck further comprises said memory or register.

Further, preferably, said desired angle is reset to match a current detected angle when the tiller is re-coupled to the drive wheel.

The steering motor controller may be implemented as hardware control circuitry which is designed to implement the or each function ascribed to it above, or the functionality may be implemented in logic circuits or programmable logic, or a processor executing software instructions in any suitable code format. Where a memory or register is employed to store a desired angle, that memory or register may be integral with the control circuitry, logic, or processor, or may be separate to and addressable by the control circuitry, logic, or processor.

Preferably the tiller may be offset from the drive wheel by an angle of 75 degrees or greater, more preferably, 90 degrees or greater.

The motorised truck with tiller may preferably be a forklift truck, a pallet carrier or an order picker.

There is also provided a method of manoeuvring a motorised truck with tiller, comprising the steps of:
(a) driving the truck within an aisle with the tiller substantially aligned with a steerable wheel of the truck;
(b) positioning a front end of the truck adjacent a space into which the truck is to be manoeuvred along the aisle;
(c) adjusting the angular offset between the tiller and steerable wheel such that the steerable wheel is offset from the line of the tiller by more than 45 degrees; and
(d) driving front of the truck into said space while maintaining the offset of greater than 45 degrees between the steerable wheel and the tiller.

By "substantially aligned" is meant that the wheel is aligned to the tiller sufficiently for it to be perceived to steer true, i.e. it need not be in exact alignment.

An alternative to steps (c) and (d) is that in step (c) the tiller is offset from the neutral steering position by an amount at least equal to the angle required for the end of the tiller to be level with or forward of the back of the truck, and for the wheel to then be aligned with the major axis of the chassis, this defining an offset angle between tiller and wheel which is maintained as the front of the truck is driven into the space.

Preferably, in steps (a) and (b) said wheel is aligned with the line of the tiller to within 10 degrees or less, more preferably 5 degrees or less, and most preferably within 3 degrees or less. Most preferably, the wheel follows substantially the same angle as the tiller within the control limits of the steering motor and controller.

Preferably in steps (c) and (d) the steerable wheel is offset from the line of the tiller by 60 degrees or more, more preferably 80 degrees or more. A particularly preferred implementation of the method has an offset defined when the wheel is aligned to the chassis and the tiller rotated by an amount sufficient to bring the end of the tiller level with or forward of the rearmost point of the truck body.

BRIEF DESCRIPTION OF THE DRAWINGS

Embodiments of the invention will now be described, by way of example, with reference to the accompanying drawings, in which:

FIGS. 1a and 1b (previously described) are schematic top plan views of a conventional pedestrian-operated forklift truck.

FIGS. 3a to 3c are perspective views of the steering mechanism of the truck of FIG. 2.

DETAILED DESCRIPTION OF PREFERRED EMBODIMENTS

Figure 2A:
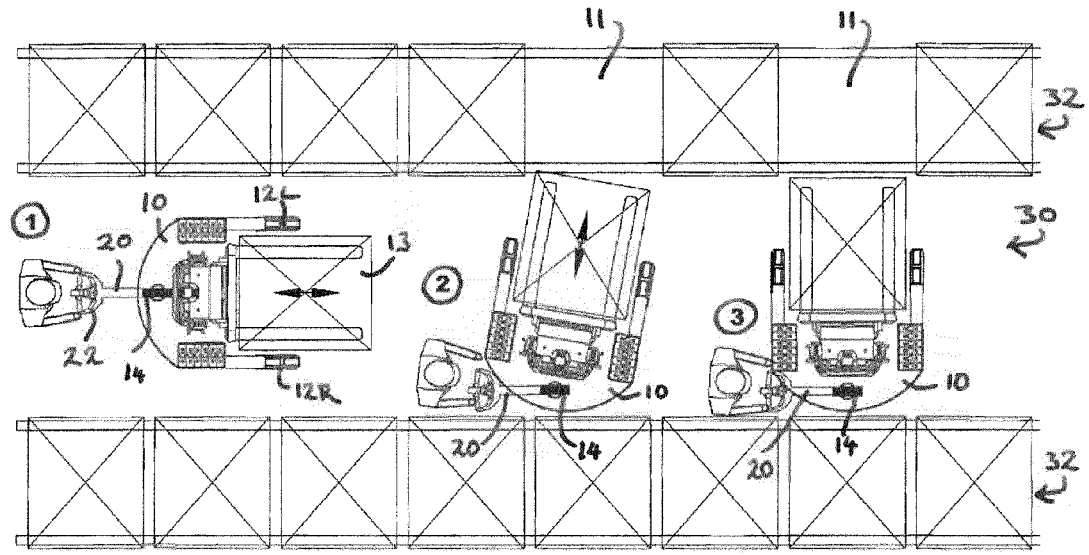
FIGS. 2a and 2b are schematic top plan views of an embodiment of motorised truck with tiller according to the invention as it manoeuvres through a typical series of operations in an aisle.

In the drawings the same reference numerals have been used for the same or equivalent components.

Figure 2B:
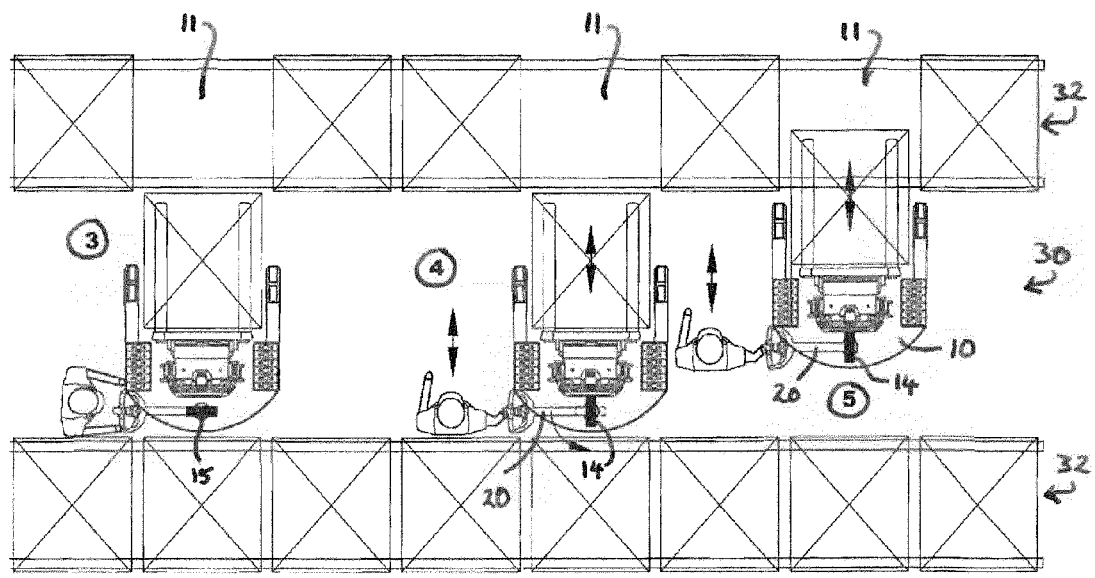

Referring to FIGS. 2a and 2b, a pedestrian-operated forklift truck or pallet carrier is shown successively in five positions denoted 1, 2, 3, 4, 5 (position 3 is repeated at the end of FIG. 2a and at the start of FIG. 2b for continuity) as it is manoeuvred into a space 11 in an aisle 30 between two rows of palletised products. The truck is generally of the same configuration as described above in relation to FIGS. 1a and 1b and thus like parts such as chassis 10, tiller 20, steerable wheel 14, etc.) are denoted by like reference numerals and need not be described specifically again.

The aisle is of a width which is not much greater than the length of the truck plus its load 13, as can be seen from position 3 in FIGS. 2a and 2b. Nevertheless the truck can be manoeuvred into and out of the space 11 with ease where such space would not permit a conventional truck with tiller to be operated.

In position 1 (leftmost image of truck in FIG. 2a), the truck is operating in a normal mode of operation, with the rear, steerable wheel aligned to the axis of the tiller 20. In conventional manner the operator manoeuvres the truck to position 2 (centre position, FIG. 2a) where the load 13 is almost aligned with the space 11 and then to position 3 (rightmost position of FIG. 2a and leftmost of FIG. 2b).

While a conventional truck could be manoeuvred into position 3 it could not be driven into the space 11 because the steering direction of wheel 14 is perpendicular to the desired direction of travel.

The truck of FIGS. 2a and 2b, however, is provided with the functionality to change the angle between the wheel and the tiller to a non-zero offset. In particular it can be changed to an angle where it is aligned parallel with the major front-rear direction of the chassis, this being the position with respect to the chassis as shown in position 4 (centre, FIG. 2a). The same axis can also be defined as the axis in which the tiller is in a neutral steering position (see position 1), or the axis defined by the direction of the forks.

The offset angle can be changed using a steering motor which turns the wheel relative to the chassis and/or tiller, or using a ratcheting action in combination with a mechanism to selectively decouple the tiller from the wheel and recouple it to the wheel, both of which are described below.

Figure 4:
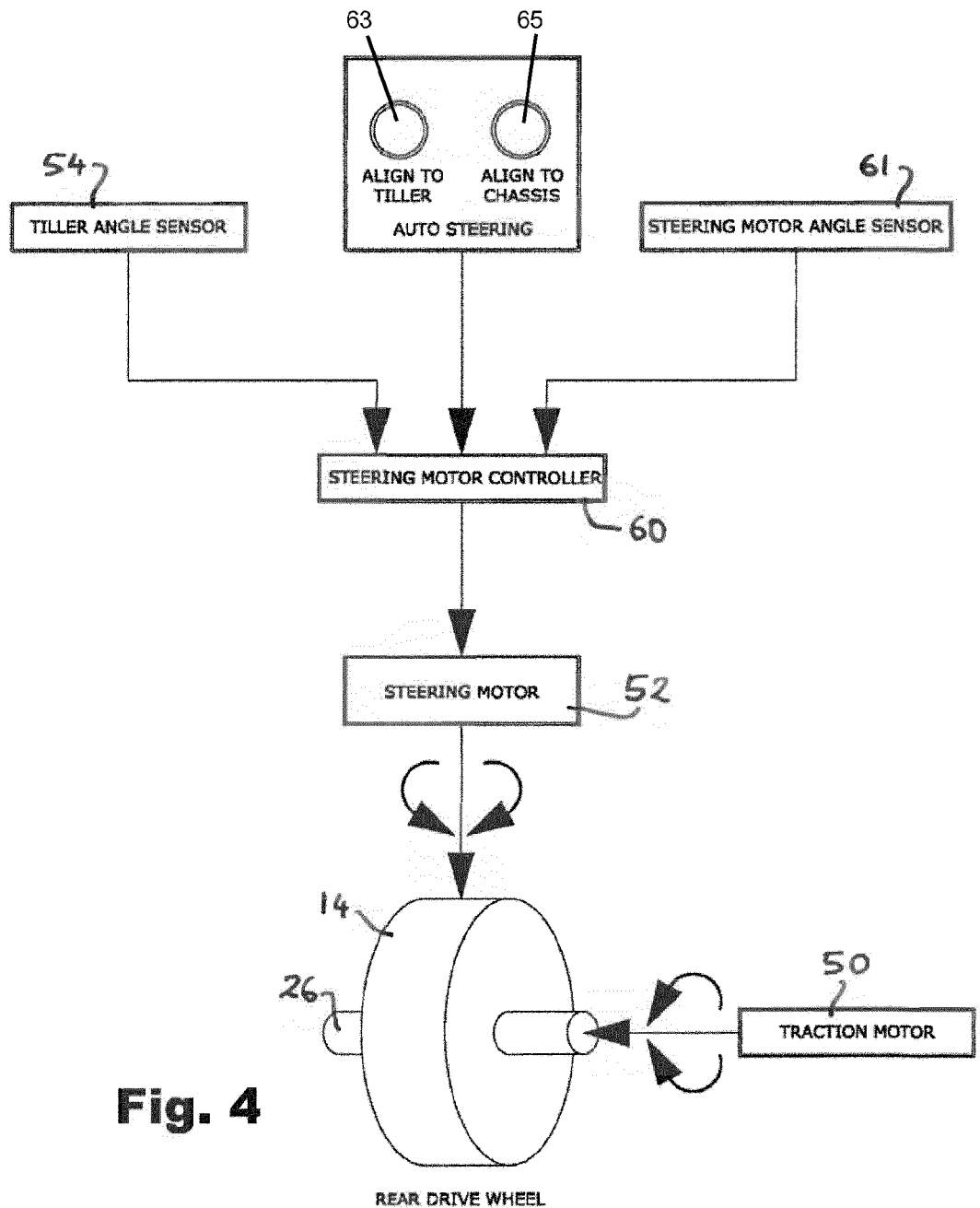
FIG. 4 is a block diagram of the control circuit for the truck of FIG. 2.

On attaining the position shown in FIG. 4, the operator is now alongside the truck with the tiller 20 offset from the wheel 14 by about 90 degrees (it could be more or less). The tiller head is provided again with drive controls which when activated allow the truck to be driven forward or in reverse, including when the tiller is offset. Thus, the operator engages the forward drive and the front of the truck and its load 13 enters the space 11 where the load can be unloaded.

The angle need not be 90 degrees. For the truck to work within its minimum operable aisle width, the tiller needs to be rotated so that the end of the tiller and tiller head is level with or forward of the rearmost point of the truck body, as can be seen in position 3. Depending on the truck layout this minimum amount of rotation could be significantly less than or greater than 90 degrees.

At no point in positions 4 and 5 does the tiller need to be straightened, and the steering of the truck can be adjusted and fine tuned in the normal way by steering the tiller from side to side. The steering motor responds as normal, i.e. when the tiller is rotated about its axis 15 (see position 3, FIG. 2*b*) by say 5 degrees clockwise, the steering motor will rotate the wheel 14 also by 5 degrees clockwise so that the wheel continues to follow the tiller but with a different angular offset from normal, i.e. a non-zero angle which in this case is about 90 degrees.

The removal of a pallet or load from the rows is accomplished in reverse. The empty truck is manoeuvred into the row to engage and pick up the load using the steps already described. With the operator and tiller alongside the truck (position 5), the truck is driven in reverse back to the row behind the truck (position 4). The steerable wheel is then rotated to the position where it is aligned with the tiller, and again this can be done manually or using a steering motor and a steering motor can automatically align to the tiller or can align to the tiller under operator control of the steering motor. When the wheel and tiller are aligned (position 3) the operator is free to manoeuvre the truck back to positions 2 and 1.

FIGS. 3*a* to 3*c* show the traction motor, steering motor and associated components of the truck. Only a small part of the truck chassis 10 on which these components are mounted is shown, but the rest of the truck is as described above.

The rear wheel 14 is driven in forward or reverse directions by a traction motor 50 under the control of control members (not shown in FIGS. 3*a* to 3*c* but shown and described below in relation to FIG. 8) on the tiller head 22, as previously described. This is well-known. While it is preferred to drive the rear wheel, additional or alternative wheels could be driven instead.

The steering angle of the rear wheel 14 relative to the chassis 10 is adjusted by rotation of the wheel 14 about a vertical axis—this is effected by a steering motor 52. The steering motor is preferably an electric motor in the embodiment shown, but may equally be hydraulic, pneumatic, or of any other suitable type.

A sensor 54 determines the angular position of the tiller 20 relative to the chassis 10. A steering motor controller 60, responsive to the sensor 54, actuates the steering motor 52 so that the rear wheel 14 rotates about a vertical axis by the same angle and in the same direction as the tiller 20. In other words, the steering angle of the rear wheel 14 relative to the chassis 10 increases or decreases as the angle of the tiller 20 relative to the fore-aft direction of the chassis 10 increases or decreases, by the same amount and in the same direction of rotation. Thus any angular offset between the tiller 20 and the rear wheel 14 which was previously set is maintained.

FIG. 3*a* shows the steering mechanism when the tiller 20 is in line with the rear wheel 14, i.e. the offset angle is zero, FIG. 3*b* shows the steering mechanism when the offset angle between the tiller 20 and rear wheel 14 is 45 degrees, and FIG. 3*c* shows the steering mechanism when the offset angle is 90 degrees.

Referring next to FIG. 4, a schematic of the steering components shown in FIGS. 3*a* to 3*c* is shown as a block diagram. The wheel 14 rotates on an axis 26 when it is driven by a traction motor 50 using conventional operator controls (not shown). Steering about a vertical axis is accomplished by the steering motor 52 under the control of the steering motor controller 60. As previously described the tiller angle with respect to the chassis is provided as an input from the tiller angle sensor 54.

The tiller angle sensor may be any sensor whose output is effective to allow the steering motor controller either to determine the absolute angle to the tiller relative to a chassis axis, or to determine changes in the tiller angle as it is moved about its rotation axis. Thus, where the tiller angle sensor is a rotary encoder, it may be of the type known as an absolute encoder or a relative encoder. Sensors can be digital (e.g. mechanical absolute encoders), optical (such as a source and detector which are separated by a patterned disc), magnetic (e.g. using a Hall-effect sensor to sense strips of magnetised material on a disc) or analogue (such as a synchro, resolver, rotary variable differential transformer (RVDT) or rotary potentiometer).

A further angular sensor 61 is provided on the steering motor, which senses the angle of the output shaft from the motor (and hence the angle of the steerable wheel mounted on that shaft) relative to the motor housing (and hence the chassis to which the housing is mounted).

Also shown are operator controls including an "align to tiller" button 63 and an "align to chassis" button 65, which are typically provided on the tiller head, for example at the position shown at 40 in FIGS. 3*a* to 3*c*.

Figures 5, 6:
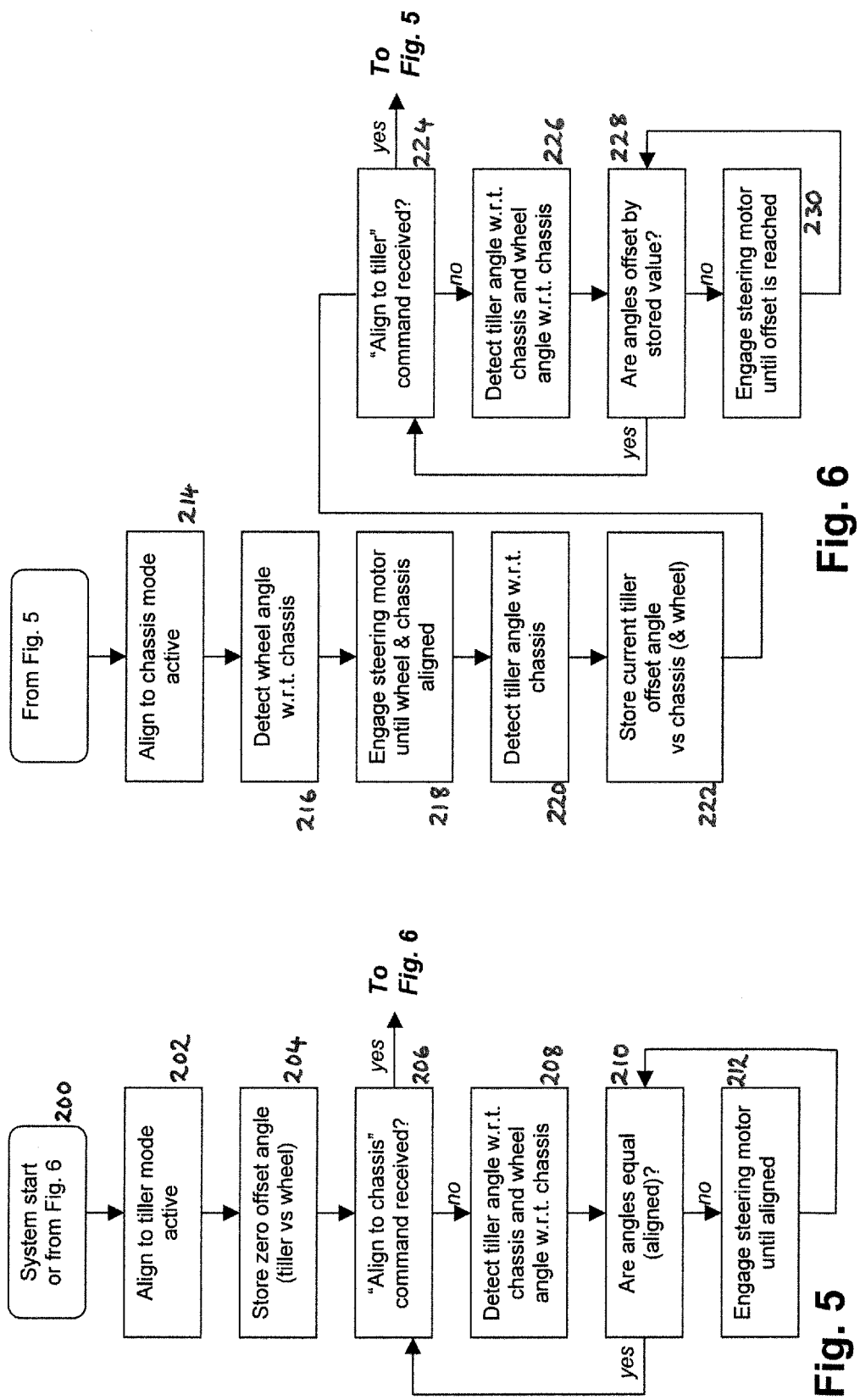
FIG. 5 is a flowchart of operation of a steering motor controller for use in a motorised truck with tiller according to the invention, when in an "align to tiller" mode.
FIG. 6 is a second flowchart of operation of a steering motor controller for use in a motorised truck with tiller according to the invention, when in an "align to chassis" mode.

FIGS. 5 and 6 illustrate the operation of the steering motor controller in a particularly preferred embodiment which allows the operator to engage either of two modes to automatically align the steered wheel with either the axis of the tiller in one mode, or the main front-rear axis of the chassis in the other mode (i.e. from position 2 to position 3 in FIG. 2*b* and vice versa, in accordance with the operator selecting buttons 63 or 65). FIG. 5 shows the operation of the controller on system start-up and when in the "align to tiller" mode, while FIG. 6 shows the operation of the controller in the "align to chassis" mode.

In FIG. 5 the controller 60 starts up in a normal mode of operation, step 200, and by default the controller will keep the steerable wheel aligned to the tiller, step 202.

The controller has stored in an internal or external register or a memory accessible to it (not shown) a predetermined angular offset which initially is set to zero and which is always reset to zero when the controller reverts to the "align to tiller" mode and the flowchart of FIG. 5 is restarted, step 204. This means that the controller is configured to keep the wheel 14 aligned with the tiller 20, i.e. with a zero degree offset, as is shown in e.g. FIG. 2*a*, positions 1, 2 and 3.

The controller, after initialising or resetting the stored value to zero, operates in a feedback loop. This loop can be interrupted at any point by the operator pressing the "align to chassis button". For the purposes of the flowchart illustration, this interruption is indicated by the controller, on each iteration, making a check to see if the button 65 has been operated, step 206. In actual operation, the feedback loop used for normal steering may not explicitly check for this input in step 206, as it will be configured to receive an interrupt signal, and the steering feedback loop will comprise steps 208, 210, 212 as will now be described.

In step 208, the inputs from the tiller angle sensor and the wheel angle sensor are received. In a preferred embodiment, each sensor will return a voltage value which varies from a minimum at one extreme of rotation, through a midpoint at the neutral straight ahead position (of the tiller or wheel respectively), to a maximum at the other extreme of rotation. As indicated previously, this type of sensor is simply one option that may be used. Digital or other analogue sensors can equally provide inputs as to the absolute position or amount of rotation of the tiller or the wheel relative to one another, to the chassis, or to any other component of the truck or the external environment. The inputs from the two sensors are appropriately calibrated to one another so that the controller can interpret each input as being indicative of the angle at which the tiller or wheel is positioned relative to the chassis, and by simple comparison or subtraction, from one another.

In step 210 this comparison is conducted, and the difference between the angles is compared to the stored offset which in this case is zero. If the tiller and wheel are offset by a zero angle, no action is needed, and the process then reverts to steps 206 and 208. If however there is a mismatch, then in step 212 the steering motor is provided with an output to rotate the wheel until the angles match.

Steering is accomplished by the operator turning the tiller about its vertical axis. This will lead to the controller detecting and correcting a mismatch between the detected tiller angle and wheel angle. Because the process operates in a feedback loop, the wheel should closely follow the tiller except in cases of violent movement of the tiller and the operator should not notice any appreciable lag.

Accordingly in the normal operating mode, and when the align to tiller function is active, the steering motor rotates the wheel to "follow" the tiller under the direction of the steering motor controller. That controller is continually trying to maintain a predetermined zero degree offset between the wheel and tiller.

Now, assuming that the tiller is aligned with the wheel, i.e. the predetermined offset angle stored in memory is zero, we next look at what happens when the operator depresses the "align to chassis" button 65, as would occur when the operator is seeking to rotate the wheel so that it is no longer aligned with the tiller (position 3) but rather is aligned with the chassis (position 4). As indicated in step 206 of FIG. 6 this interrupts the normal steering operation and the controller instead starts to implement the process of FIG. 6.

In FIG. 6, the align to chassis mode is active, step 214. Although not shown in FIG. 6, a safety check may be conducted before implementing the align to chassis operation. If the truck is moving at a speed where it would be unsafe to suddenly change the steered wheel angle (this may be a function of the motor speed, and optionally the current tiller angle) then the command to align to chassis may be ignored and the process may revert to FIG. 5. Assuming however that the truck is at a safe speed, i.e. a low speed or stopped, the controller will firstly realign the wheel to the chassis axis and will then allow normal steering but with the tiller offset from the wheel.

Thus, in step 216, the controller detects the wheel angle (with respect to the chassis). In most cases when this occurs the wheel will currently be aligned to the tiller, and the tiller will be at a non-zero angle to the main front-rear chassis axis. The steering controller realigns the wheel by engaging the steering motor until the input from the wheel angle sensor indicates a zero angle with respect to the chassis, step 218. At this point the tiller may have remained in the same position or may have been moved by the operator by a smaller or larger amount. In either case, once the wheel and chassis axis are aligned, the current tiller angle is detected with respect to the chassis, step 220, with the intention of now "locking" the steering of the wheel to the tiller with this offset. The detected angle (or a value such as a voltage or digital quantity indicative of the angle) is stored in the memory or register available to the controller, step 222. This value denotes the offset of the tiller with respect to both the chassis and the wheel, given that the latter two are aligned.

Once this is achieved, the controller actually works in the same way as was described with respect to FIG. 5, steps 208, 210, 212 but with the exception that rather than the controller using feedback to ensure the wheel follows the tiller with a zero degree offset, the controller in the further operation of FIG. 6 will act to ensure the wheel follows the tiller's steering movements with the same constant offset as was present when the steering motor had aligned the wheel to the chassis in step 218.

As with FIG. 5, the controller's operation can be interrupted by detection of the "align to tiller" command, step 224. Also, and not shown for clarity, the controller's operation can also be interrupted by the receipt of a further "align to chassis" command. The operator, having aligned the wheel to the chassis and manoeuvred the truck, may want to resume conventional steering, in which case the align to tiller command will be used, or may want to align the wheel to the chassis with a new offset, perhaps more or less extreme, or with the tiller offset to the other side of the truck body. Therefore the "align to chassis" command is available to realign the wheel even though the truck may be operating in the align to chassis mode already.

Assuming no such interruption is received in step 224, the steering operation continues by detecting the angles of both the tiller and the wheel with respect to the chassis, step 226.

By comparison and subtraction, the controller determines the angle of offset between the tiller and wheel and checks, step 228, whether the offset is as desired, i.e. equal to the predetermined offset value stored in memory in step 222. If so, no steering output is needed and the process reverts to step 224. If however there is a discrepancy, then the steering motor is engaged until the desired offset is restored or reached, step 230.

If in step 224 the controller detects that the align to tiller mode has been selected once again, the process moves back to FIG. 5. This has the result that the current offset angle stored in memory is overwritten with a zero degree offset (FIG. 5, step 204) and the controller then, in accordance with the normal steering operation (steps 208, 210, 212) rectifies the mismatch between the detected tiller-wheel offset and the desired offset of zero.

The skilled person will appreciate that the steering operation in both FIGS. 5 and 6, after correction of a mismatch as described immediately above in FIG. 5, or after the alignment to the chassis in FIG. 6, operates in precisely the same way: it has a desired offset value which it is seeking to maintain and responds to tiller inputs by moving the wheel to maintain the desired predetermined offset. When acting in this way, it is said to be in a normal mode of operation, and while varying the offset angle to zero with respect to the tiller or the chassis, it is said to be in a realignment mode of operation.

A further embodiment will now be described with reference to FIGS. 7 to 12. The embodiment of FIGS. 7 to 12 below, and the embodiment of FIGS. 2 to 6 above, are united by the fact that, in a normal mode of operation, the controller controls the steering motor to maintains a predetermined angular offset between the tiller and wheel, and in that the angular offset between the tiller and steerable wheel may be adjusted and the adjusted angular offset subsequently used as the predetermined angular offset.

While the adjustment preferable happens automatically as described above in relation to FIGS. 4, 5 and 6 and below in relation to FIG. 11, or semi-automatically (i.e. with powered steering but under a manual control) as described below in relation to FIG. 10, it can also occur manually as described below in relation to FIGS. 7 and 9.

Referring to FIGS. 7a to 7e, an alternative embodiment of a pedestrian-operated forklift truck has a tiller 20 which can be selectively de-coupled and re-coupled to the rear wheel 14. This allows selective rotation of the tiller 20 independently of the rear wheel 14 to allow the tiller to be fixed at different angular positions relative to the rear wheel. As seen in FIGS. 3a to 3e the tiller head 22 has a push button (which may also be located at position 40 and will be referred to as push button 40) which when pressed down de-couples the tiller 20 from the rear wheel 14 and, while being held pressed down, allows the tiller to be rotated through any selected angle (within the design limits of the truck) while the steering angle of the rear wheel 14 relative to the truck chassis 10 remains fixed. When the operator 24 has moved the tiller to a desired angular offset from the rear wheel 14, the button 40 is released and the tiller 20 is re-coupled to the rear wheel. From this point on, until the button 40 is next pressed, and as described previously, rotation of the tiller 20 through any angle in either direction will rotate the rear wheel 14 through the same angle in the same direction, while retaining the selected angular offset.

A more sophisticated control pad for use on a tiller head is described below in relation to FIG. 12. It is to be understood that the push button, or any other control interface, need not necessarily be located on the tiller head, but for operator convenience, it is preferable to locate this within easy reach of the operator and the tiller head is therefore preferred.

Figure 7A:
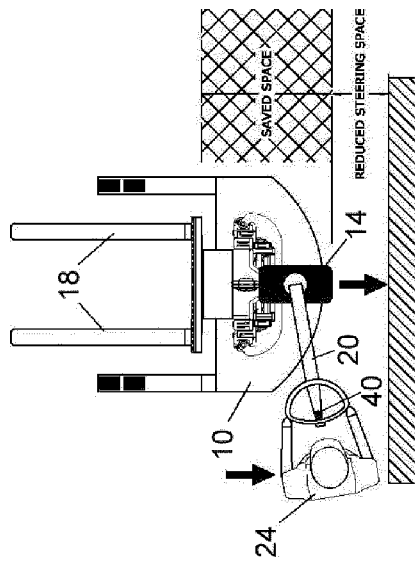
FIGS. 7a to 7f are schematic top plan views of another embodiment of motorised truck with tiller according to the invention, and a typical sequence of operations.

FIG. 7a shows the forklift truck positioned at right angles to a row 32 of palletised product with the rear wheel 14 in a fore-aft steering position in line with the tiller 20 which extends directly to the rear. This is equivalent to the situation shown in FIG. 1b and, as described, the steering space S is wasted storage space.

Figure 7B:
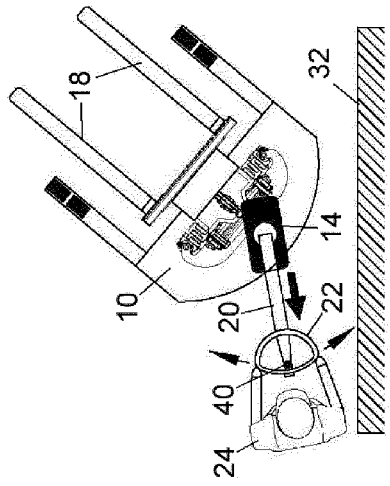

In FIG. 7b, the operator 24 has de-coupled the tiller 20 from the rear wheel 14 by pressing the button 40, and while holding the button 40 pressed has moved the tiller clockwise through nearly 90 degrees. The rear wheel 14 stays in its original fore-aft orientation.

Figure 7C:
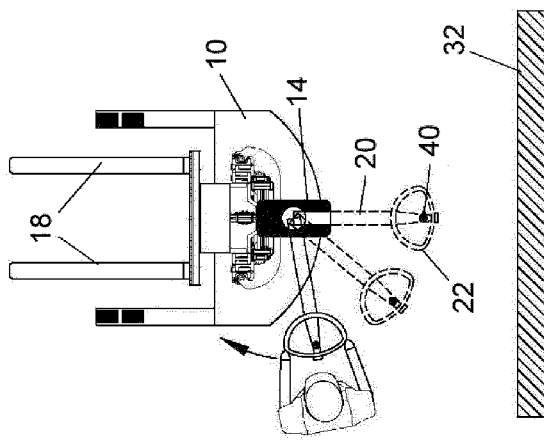
Figure 7D:
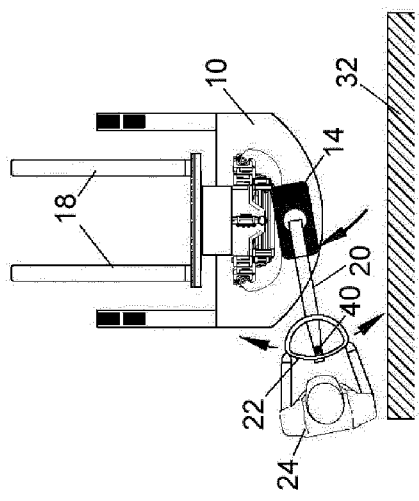
Figure 7E:
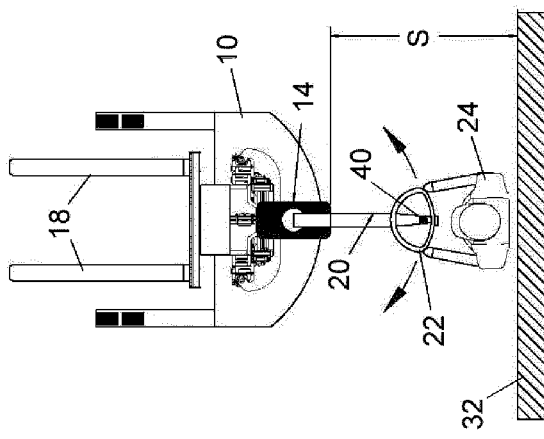
Figure 7F:
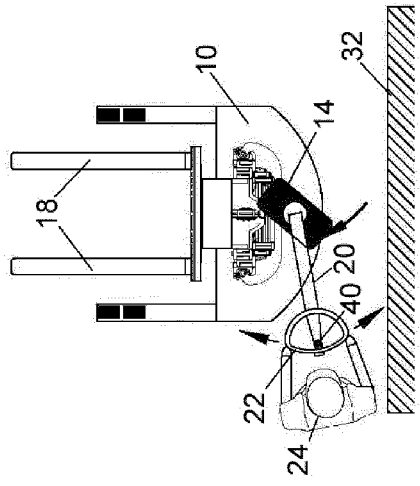

Next, FIG. 7c, the operator backs the truck towards the row 32, the rear wheel 14 remaining in the fore-aft orientation. This movement is accomplished by operating a control (not shown in FIGS. 3a to 3e but visible in the control pad of FIG. 12 described below) on the tiller head to actuate a drive motor driving the rear wheel 14. Now the truck can approach the row 32 much closer since the tiller 20 is off to one side, requiring a much smaller steering space. While backing the truck the tiller 20 can stay de-coupled from the rear wheel 14 (traction control operates irrespective of whether the tiller and rear wheel are coupled or not), or it can be re-coupled to the rear wheel 14 by releasing the button 40.

To return to the normal steering configuration (i.e. rear wheel in line with the tiller) the tiller is "ratcheted" back and forth through a small angle, the button 40 being held pressed during anti-clockwise movements when the tiller arm is decoupled, and released during clockwise movements when the tiller arm is coupled to the rear wheel 14. This will gradually bring the rear wheel 14 into line with the tiller 20, FIG. 7e, after which normal steering of the truck can be resumed, FIG. 7f.

Although the drawings show the tiller 20 being offset clockwise relative to the rear wheel 14, it is capable of being offset either clockwise or anti-clockwise.

Figure 10:
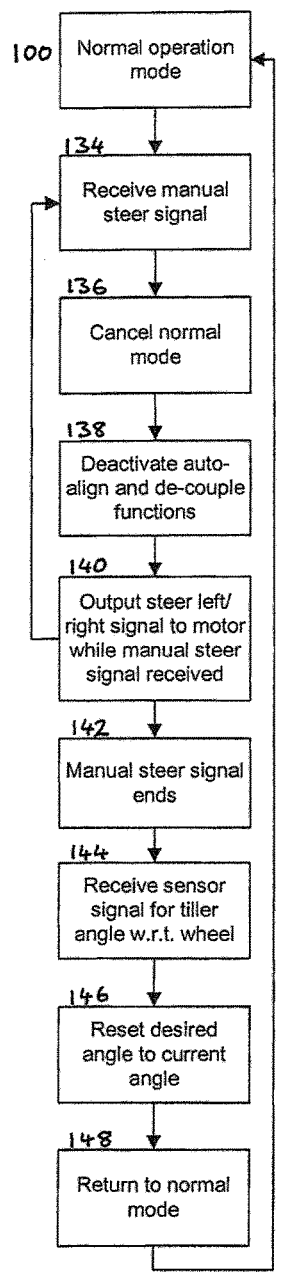
Figure 11:
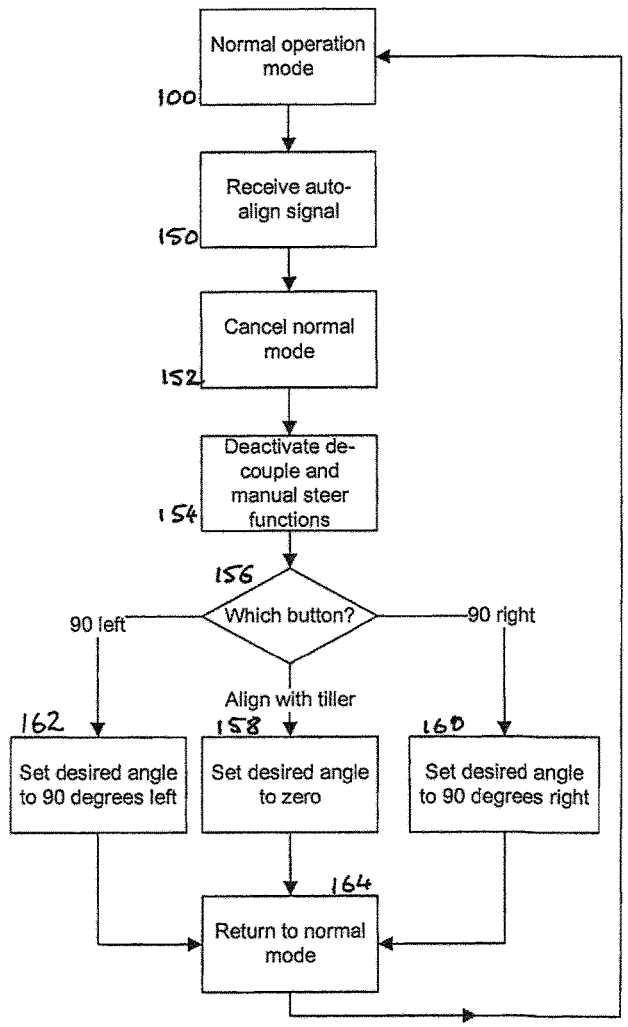
Figure 12:
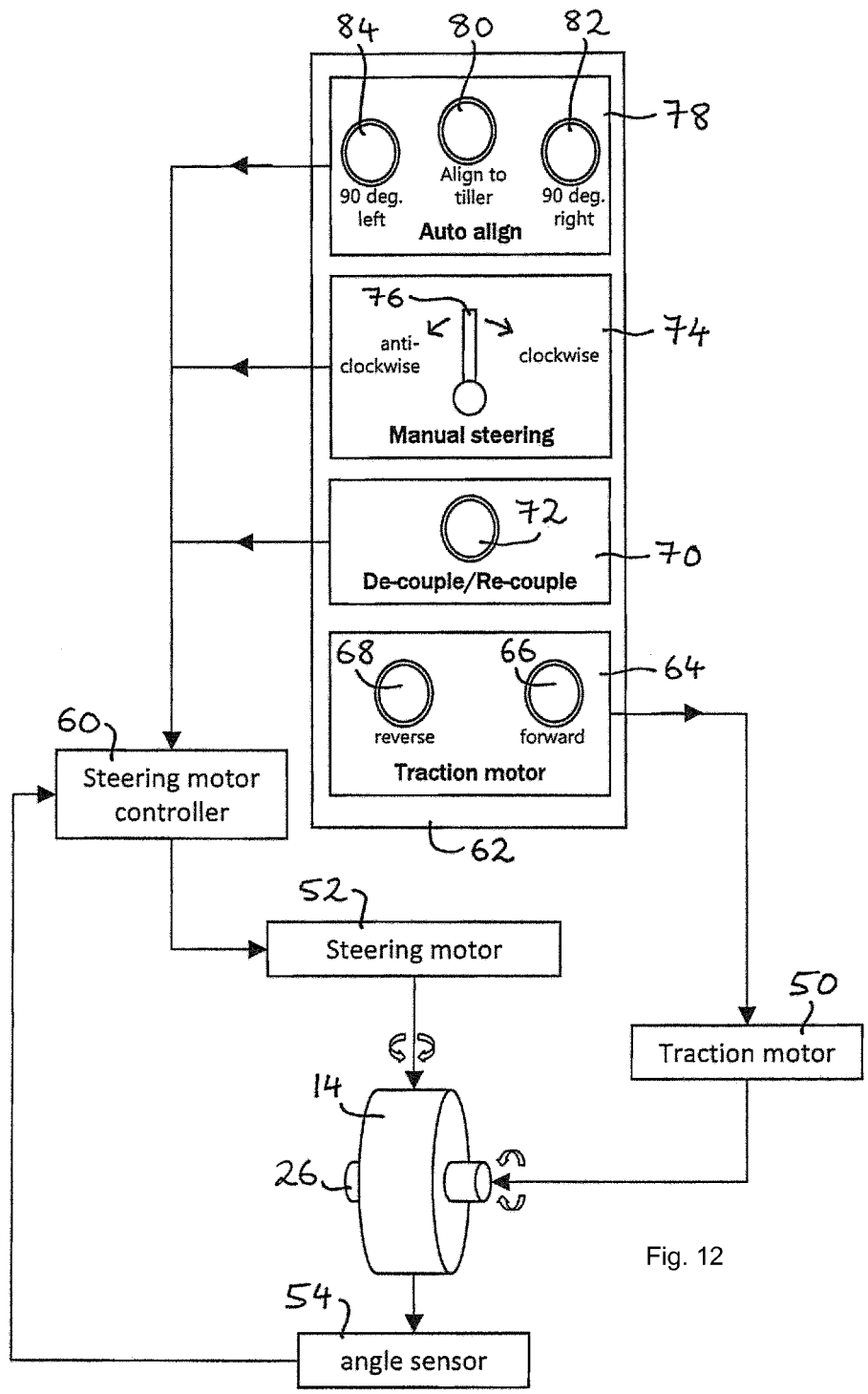
FIG. 12 is a block diagram of the control circuit for the forklift truck.

Referring next to the flowcharts of FIGS. 8 to 11 and the control circuit of FIG. 12, further details of the operation of an alternate steering motor controller 60 are shown. FIGS. 8-11 show in flowchart form the programmed operation of a steering motor controller which can be seen in FIG. 12, in various modes of operation.

As seen in FIG. 12 the steering motor controller 60 is connected to the steering motor 52 such that appropriate control signals may be output from the controller 60 to the steering motor 52 to rotate the steering angle of the wheel 14 relative to the tiller or chassis.

A control pad 62, preferably provided on the tiller head (not shown in FIG. 12) contains four control areas, namely a traction motor control area, a de-couple/re-couple control area 70; a manual steering area 74; and an auto-align control area 78.

The traction motor control area 64 is provided with forward and reverse control buttons 66,68 and is directly connected to the traction motor. When the buttons 66,68 are depressed, control signals are sent to the traction motor to drive the wheel about its axis 26 in the forward or reverse direction respectively. Although as shown the traction control is a single-speed control, the skilled person will be aware of control mechanism allowing for graduated speed control, for example a dial could be employed allowing any degree of speed between full speed forward and full speed reverse, or a low speed toggle switch could be employed in combination with simple forward/reverse control buttons of the type shown in FIG. 12 to allow for slower manoeuvring in tight spaces.

Figure 8:
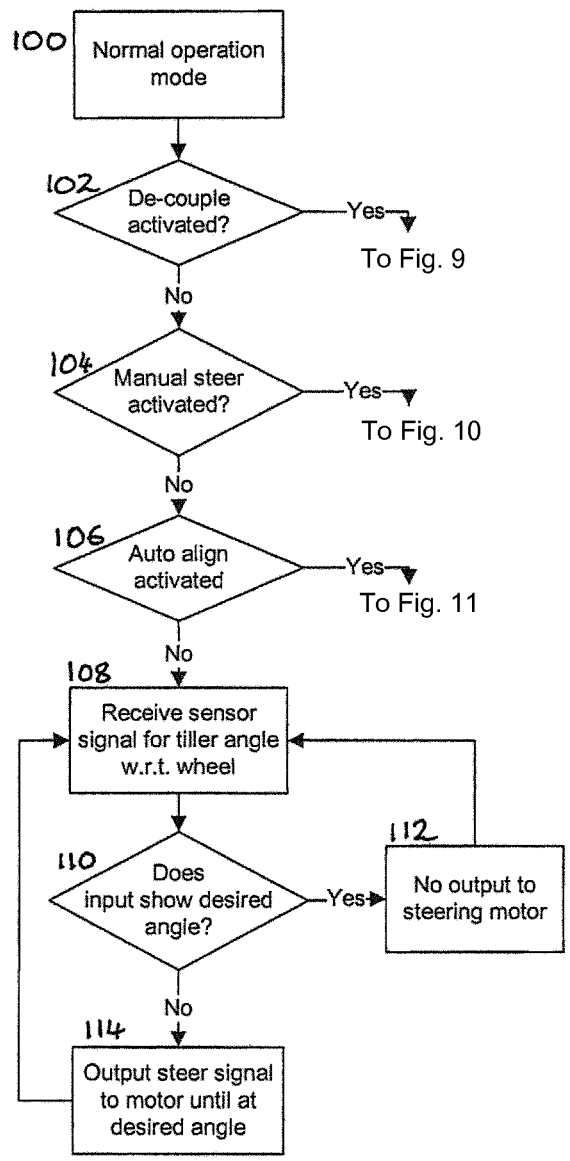
FIGS. 8 to 11 are flowcharts detailing the operation of a steering controller in various modes of operation.

Referring additionally to FIG. 8, a "normal" mode of operation is described, in which the operator is simply operating the traction control area 64, and not the additional control areas 70, 74, 78.

In step 100 the truck is in the normal operation mode. It remains in this mode provided that the de-couple mode is not activated (decision 102, leading to FIG. 9); the manual steer mode is not activated (decision 104, leading to FIG. 10); and the auto-align mode is not activated (decision 106, leading to FIG. 11). In the normal mode the operator uses the forward and reverse buttons to drive the truck forward and in reverse. Steering is accomplished by turning the tiller about its vertical axis and as previously described an angle sensor determines the relative angle between the drive wheel (about its vertical axis) and the tiller. This signal is received in step 108.

A register or memory area (not shown) provided in or accessible to the controller stores a "desired angle" for the sensor signal. In most cases, and on initialising the system, the desired angle is zero, i.e. the tiller and wheel are in alignment and any movement of the tiller causes a requirement for the wheel to be rotated about its vertical axis to regain alignment and to revert to the desired angle of zero.

Thus, a feedback loop is operated wherein the sensor signal is received in step 108, and a check is made, decision 110, whether the detected angle is the same as the desired angle stored in memory. If so, step 112, there is no output to the steering motor and the feedback process reverts to step 108.

If however a discrepancy is noted, i.e. the tiller has moved to a different angle than that desired, an output is provided to the steering motor in step 114 to rotate the wheel about its vertical axis until the desired angle is once again regained.

As previously described, the tiller can be decoupled from the wheel by depressing button 40 in the embodiment of FIGS. 3*a* to 3*c*, or in FIG. 12 if one refers to the de-couple/re-couple control area 70, this is provided with a single on/off button 72 which when depressed similarly de-couples the tiller from the wheel and when released re-couples the tiller to the wheel. This button 72 directly replaces the button 40 shown in FIGS. 3*a* to 3*c*.

Figure 9:
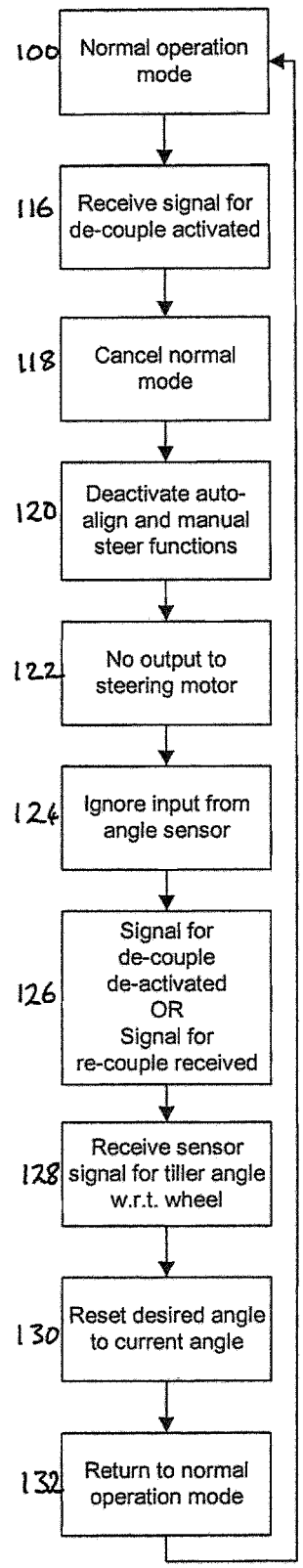

Referring now to FIG. 9, when button 72 is depressed this results in a "de-couple" signal being received by the controller 60, step 116. The controller then cancels normal mode (i.e. the operation as shown in FIG. 8), step 118 with the result that the auto-align and manual steer functionality is no longer available, step 120; there is no further output to the steering motor, step 122; and input from the steering angle sensor is ignored, step 124 (or the sensor temporarily deactivated until the controller re-enters normal mode). The truck is now in the de-coupled mode.

In this mode, until the de-couple signal is deactivated, or a re-couple signal received—this depending on the design and mechanism used for the de-couple button—the tiller is rotatable independently of the wheel. In this mode the traction motor controls are still active and unaffected. As described earlier the till can thus be offset relative to the wheel and no attempt is made to realign the wheel with the tiller as long as the two are decoupled.

Once the decoupling is deactivated or a recoupling signal is received, step 126, the sensor signal is again received and processed, step 128. In most cases the tiller will have been offset while in the decoupled mode and will no longer be at the desired angle. So for example if the initial desired angle was zero with the tiller and wheel aligned, and the tiller was then decoupled and rotated 90 degrees counter-clockwise out of alignment from the wheel, the sensor will report a wheel angle of 90 degrees clockwise rotation relative to the tiller. This initial indication of the new tiller-wheel angular relationship is used to reset the desired angle stored in memory to this new angle, step 130, and the truck is then returned to the normal mode of operation, step 132.

From this point on the normal mode of operation reverts to the process of FIG. 8 as previously described, but with a desired angle now set at 90 degrees, so that the feedback loop between the sensor, controller and motor now strives to maintain the offset at this same 90 degree angle. In other words the tiller and wheel are now "locked" 90 degrees out of alignment.

When the steering is the tiller is "ratcheted" back and forth through a small angle as previously described, the steering controller repeatedly flips between the normal mode of FIG. 8 (button released and tiller locked to wheel) and de-coupled mode of FIG. 9 (tiller free and rotatable independently of wheel), with the desired angle being reset to the new angular relationship every time the button is released.

Referring now to FIG. 10, and additionally to the manual steering control area 74 of FIG. 12, it can be seen that a toggle switch 76 is provided which is biased to a neutral position as shown in FIG. 12 but which can be rotated clockwise or anti-clockwise to actuate manual steering of the wheel 14 (similar in action to turning a key in either direction in a spring-loaded lock). When the switch is toggled in either direction, a manual steer signal (clockwise or anti-clockwise depending on how the switch was toggled) is received by the steering controller, step 134.

The controller cancels normal mode, step 136 and deactivates the auto-align and decoupling functionality of the control pad, step 138. The truck is now in manual steering mode.

In this mode, the steering motor controller outputs left and right (or clockwise and anti-clockwise steering signals to the steering motor for as long as the manual steer signals are received from the toggle switch 76. It will be appreciated that in place of a simple toggle switch, a steering wheel, left/right paddle controls, or any other known and suitable steering control could be used to independently rotate the wheel about its vertical axis.

When the manual steering signal stops, step 142, a sensor angle indication is received, step 144, and the desired angle is reset to the new angular relationship between tiller and wheel, step 146. The truck is then returned to normal mode, step 148.

Using this mechanism, the driven wheel can be rotated to a new angle without ratcheting or manipulating the tiller. This is useful, for example, in realigning the wheel to the tiller. Again the traction control is fully active when in the manual steering mode.

FIG. 11 shows the functionality of the auto-align control area 78 of FIG. 12. The auto-align control area 78 is provided with three buttons namely an "align to tiller" button 80, a "90 deg. Right" button 82, and a "90 deg left" button 84. The operator can use these buttons to align the wheel automatically to the tiller or at an offset of 90 degrees left or right. Obviously one could provide additional or alternative controls if it were desired to frequently offset the tiller from the wheel at different angles such as 45 degrees, 60 degrees or 80 degrees. One could additionally or alternatively place a dial or clockface with angular markings and allow an operator to select an angle from a continuous range or by switching a rotary knob to any of several preset angular positions.

In FIG. 11, the truck is in normal mode, step 110, when one of the three buttons 80, 82, 84 (FIG. 12) is depressed, resulting in an auto-align signal being received from the control pad, step 150. A different signal is received depending on which of the three buttons is selected by the operator.

The steering controller cancels the normal mode, step 152, and deactivates the de-couple and manual steer functions described above, step 154. Then, in dependence on which button has been chosen, decision 156, a different result occurs. (In reality the programmed or hardwired logic according to which the controller operates may not implement a decision at this point but instead will have three parallel functions for the three buttons. Of course any of the flowcharts of FIGS. 8-11 may be implemented in several alternative ways and the particular flowcharts describe the best known method of implementing different functions which the system designer may choose to use, modify, or leave out entirely in a given product.)

If the "Align with tiller" button was selected, step 158, the controller resets the "desired angle" stored in memory or a register assigned to that purpose, to a value corresponding to a zero degree angle. Similarly, if the 90 degree right button was selected, step 160, or the 90 degree left button, step 162, the desired angle is set accordingly to a value equivalent to the wheel being offset by the selected angle. (Whether the terminology used is "right/left", "clockwise/anti-clockwise", a graphical indication of the angle, or any other terminology, is at the preference of the system designer, as is also the choice of convention as to whether it is the offset rotational direction of the tiller or of the wheel.)

In any event, after setting the desired angle in steps 158, 160, 162, to the appropriate value to match the desired offset chosen by the operator, the controller then returns to normal mode, step 164.

Assuming that the tiller is not already at the offset specified (e.g. suppose the tiller is offset from the wheel direction by 10 degrees when the operator chooses "align with tiller"), the effect of normal mode is to follow steps 108, 110 and 114 as described in relation to FIG. 8 to output a signal to the steering motor until the sensed angle matches the angle stored in memory. This results in the flowchart of FIG. 11 being used to reset the desired angle and the flowchart of FIG. 8 then making the steering correction until the tiller is aligned with (or offset by 90 degrees etc.) the wheel.

The invention is not limited to the embodiments described herein which may be modified or varied without departing from the scope of the invention.

The invention claimed is:

1. A motorized truck with tiller comprising:
    (a) a chassis having a plurality of ground-engaging wheels, at least one of which is steerable to steer the truck;
    (b) a drive motor for driving at least one of the wheels to move the truck across the ground;
    (c) a tiller rotatably connected to the chassis which may be swung from side to side to steer the truck;
    (d) a steering motor for varying the angle of the steerable wheel;
    (e) a steering motor controller which, in a normal mode of operation, receives as an input an indication of the tiller angle and which outputs in response thereto a control signal to the steering motor to vary the angle of the steerable wheel such that the angle between the tiller and steerable wheel maintains a predetermined angular offset;
    wherein the angular offset between the tiller and steerable wheel may be adjusted and the adjusted angular offset is subsequently used as the predetermined angular offset; and
    wherein said adjustment of the angular offset is carried out by said steering motor controller in a realignment mode of operation, in which the steering motor controller outputs a control signal to the steering motor to steer the wheel to a different angular offset.

2. A motorized truck with tiller according to claim 1, wherein the steering motor controller is operable, in said realignment mode of operation, to perform automatic alignment of the steerable wheel to be parallel with either of two major axes of interest, namely the tiller axis and a major axis of the truck chassis.

3. A motorized truck with tiller according to claim 1, wherein the steering motor controller is operable, in said realignment mode of operation, to change said predetermined angle between (i) a zero tiller angle wherein the wheel is aligned parallel to the tiller and (ii) a zero chassis angle wherein the wheel is aligned parallel to an axis of the chassis and offset from the tiller by the same angle as the tiller is offset from the chassis during the realignment mode of operation.

4. A motorized truck with tiller according to claim 2, wherein said axis of the chassis is selected from an axis defined by the axis of the tiller when the tiller is in a neutral steering position; a front-rear axis of the truck; a left-right axis of the truck; and, where the truck is provided with lifting forks, an axis defined by said lifting forks.

5. A motorized truck with tiller according to claim 1, further comprising one or more manual controls which when actuated engage the realignment mode of operation.

6. A motorized truck with tiller according to claim 5, wherein the manual controls can select between at least two states, namely (i) a zero tiller angle wherein the wheel is aligned parallel to the tiller and (ii) a zero chassis angle wherein the wheel is aligned parallel to an axis of the chassis and offset from the tiller by the same angle as the tiller is offset from the chassis during the realignment mode of operation.

7. A motorized truck with tiller according to claim 5, wherein the tiller has a tiller head at its free end, the tiller head being provided with said manual controls.

8. A motorized truck with tiller according to claim 1, wherein when the steering motor controller is in said realignment mode of operation the tiller is decoupled from the steerable wheel.

9. A motorized truck with tiller according to claim 1, wherein the steering motor controller is configured to automatically revert from said realignment mode to said normal mode of operation following completion of the operation to steer the wheel so as to change said predetermined angular offset, and further wherein upon reverting to said normal mode from said realignment mode, the predetermined angular offset is updated in accordance with the offset achieved in the realignment mode.

10. A motorized truck with tiller according to claim 1, wherein the steering motor controller receives as an input an indication of the tiller angle relative to one or more of the chassis, the steerable wheel, or the steering motor.

11. A motorized truck with tiller according to claim 1, further comprising an angular sensor system of one or more sensors which detect and output an indication or indications of the relative angle between two or more of the tiller, the steerable wheel, the steering motor, and the chassis.

12. A motorized truck with tiller according to claim 11, wherein the indication or indications output by said angular sensor system provide the steering motor controller with information to determine, during a realignment mode of operation, the angle between the tiller and the steerable wheel and/or the angle between the steerable wheel and the chassis.

13. A motorized truck with tiller according to claim 11, wherein when said steering motor controller is operating to change said predetermined angle to a zero tiller angle it receives as an input from the angular sensor system information to determine the angle between the tiller and the steerable wheel, and when said steering motor controller is operating to change said predetermined angle to a zero chassis angle it receives as an input from the angular sensor system information to determine the angle between the steerable wheel and the chassis.

14. A motorized truck with tiller according to claim 1, further comprising a memory accessible to the steering motor controller in which is stored an indication of said predetermined offset angle.

15. A motorized truck with tiller as claimed in claim 1, wherein the motorized truck with tiller is selected from a forklift truck, a pallet carrier and an order picker.

16. A motorized truck with tiller according to claim 1, wherein the chassis supports the tiller at a rear end and the truck further comprises forks located at a front end of the chassis, and wherein the steered wheel is at the rear end.

17. A motorized truck with tiller according to claim 1, wherein the truck is a three-wheeled truck with two front wheels which are undriven and not steered, and a single driven, steered, rear wheel which is positioned generally beneath the rotation axis of the tiller.

18. A method of maneuvering a motorized truck with tiller, comprising the steps of:
  (a) driving the truck within an aisle with the tiller substantially aligned with a steerable wheel of the truck;
  (b) positioning a front end of the truck adjacent a space into which the truck is to be maneuvered along the aisle;
  (c) adjusting the angular offset between the tiller and steerable wheel such that the steerable wheel is offset from the line of the tiller by more than 45 degrees, wherein adjusting the angular offset is effected by steering the steerable wheel to a different angular offset; and
  (d) driving the front of the truck into said space while maintaining the offset of greater than 45 degrees between the steerable wheel and the tiller.

19. The method of claim 18, wherein in steps (a) and (b) said wheel is aligned with the line of the tiller to within 5 degrees or less.

20. The method of claim 19, wherein in steps (c) and (d) the steerable wheel is offset from the line of the tiller by 60 degrees or more, more preferably 80 degrees or more.

* * * * *